No. 80,054.
PATENTED MAY 19, 1908.
M. C. MOSHER.
TABULATOR.
APPLICATION FILED MAR. 18, 1907.
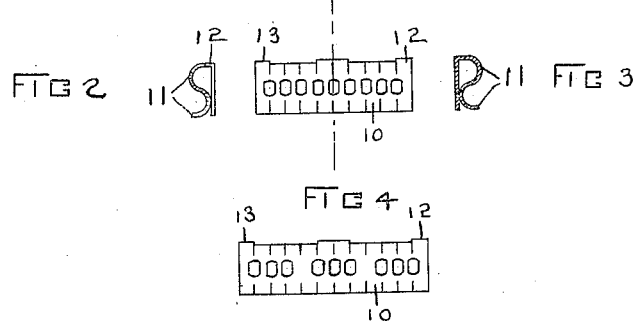
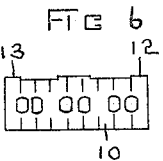
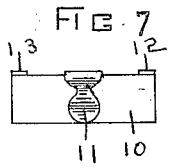
WITNESSES
B. M. Sedgwick
Frank Stewer
INVENTOR
Mary C. Mosher
BY
ATTORNEY

UNITED STATES PATENT OFFICE.

MARY C. MOSHER, OF DES MOINES, IOWA.

TABULATOR.

No. 887,954.　　　　Specification of Letters Patent.　　　Patented May 19, 1908.

Application filed March 18, 1907. Serial No. 363,033.

*To all whom it may concern:*

Be it known that I, MARY C. MOSHER, a citizen of the United States, residing in Des Moines, county of Polk, and State of Iowa, have invented a new and useful Improvement in Tabulators, of which the following is a specification.

The object of my invention is to provide a tabulator, simple, strong, durable and inexpensive in construction, which will be adapted to be fitted to the scale bar of any typewriting machine and to be easily and quickly secured in position thereon.

A further object is to provide such a device adapted to be fitted to either the upper or lower part of the scale bar the face of the device being designed to be reversible so that it may be read in either position.

My main object in providing such a device is to produce greater speed by an operator when tabulation is necessary.

My invention consists of certain details of construction hereinafter set forth, pointed out in my claims and illustrated in the accompanying drawings in which Figure 1 shows a front elevation view of my device, Fig. 2 shows a side elevation view of the same, Fig. 3 shows a sectional view taken on the line *x—x*, Figs. 4, 5 and 6 show modified forms illustrating the different styles of face plates I employ; and, Fig. 7 shows the rear elevation view of my device.

Referring to the accompanying drawings the reference numeral 10 is used to indicate the forward surface of the front plate which I employ, said plate being designed to be stamped, scored or provided with labels, with characters or figures designed to represent the graduations in the typewriting machine, and the upper and lower portions of the said forward surface of the front plate are scored in a manner similar to the scoring on a scale bar of a typewriting machine and are designed to be in a plane with their respective scoring on the scale bar when the tabulator is placed thereon. By construction the plate is of a certain length, corresponding to a certain number of graduations on the scale bar, thus obviously causing the distance from the last score on each side of the plate, to their respective ends, to be same as one graduation of the machine.

The numeral 11 indicates a spring extending rearwardly from the central portion of the front plate and then curving downwardly and forwardly to engagement with the rear portion of the front plate, said spring being designed to secure the tabulator to the scale bar of the machine and the numerals 12 and 13 indicate lugs, one extending rearwardly from each end of the upper portion of the front plate, said lugs being designed to engage the longitudinal edge surface of the scale bar and to retain the tabulator in position thereon.

In constructing my device I usually employ different styles of stamping for the face plate and also different sizes of face plates, as more fully illustrated in the drawings. It will be observed that the style shown in Fig. 1 contains nine ciphers, or other characters, evenly spaced and arranged, said ciphers being divided into sets of three each, by means of dividing lines as shown. The said ciphers are equal distances apart however, and the dividing lines are designed to cause the desired separation without affecting the regular spacing of the ciphers. This particular style of front plate is of great advantage in numbering, where the numbers sometimes contain several numerals and no dividing or separating comma or periods are desired. The face plate shown in Fig. 4 is similar to that just described, with the exception that it is two spaces wider, the two spaces being used to separate the ciphers into sets of threes with a space between each set. In the spaces left between the groups, as described, separating periods or commas are designed to be placed, and this style of plate is used in numbering when the operator desires the separation as described. The style shown in Fig. 5 is the smaller size with only three ciphers and it is adapted to be used between columns of figures, or for joining with other tabulators, or in fact when ever a small tabulator is desired. The style shown in Fig. 4 is designed almost exclusively for dating purposes, the ciphers being divided into sets of twos, the first set being designed to indicate for writing the number of the month, the second set to indicate for writing the day of the month, and the third set being designed to indicate for writing the year.

In practical operation my device, as described, is fitted upon the scale bar of a typewriting machine, the front plate engaging the forward surface of the bar, the scores on the plate being in line with the scores on the scale bar, and the spring 11 engaging the rear surface and clamping my device securely thereon. The lugs, as described, retain it in position. My device may also be placed, as hereinbefore mentioned, on the top scale bar or at the base of the scale bar and pointing upwardly.

It is obvious that my device is adjustable and may be placed at any desired point on the scale, and the operator places it in such a manner as to bring the end of the tabulator, or a space between the groups of the numerals on the face of the front plate, at a point where the decimal point or comma is to be placed, and it is apparent that when the carriage reaches the point where the indicator on the scale bar points to the end of the tabulator, or the space between the groups, as the case may be, the operator places the decimal; and it is equally ovbious that the operator may work forward or backward therefrom without raising the carriage, thus facilitating the work and producing greater speed.

Having thus described my invention what I claim and desire to secure by Letters Patent of the United States is:

1. A tabulator comprising a rectangular plate to engage the front face of the typewriter scale bar, a single hook on said plate disposed on the rear face, and central of the length thereof and adapted to engage the rear face of the scale bar, and a lug at each end of said plate each lug engaging the top longitudinal edge of the scale bar and being in length approximately the width of the scale bar.

2. A tabulator comprising a rectangular plate, a hook on said plate extending rearwardly from the center of the top edge of the plate, said hook being of S-shape and extending substantially the width of said plate, and a pair of short right angular lugs on opposite sides of said spring extending rearwardly from said top edge of the plate to engage the top longitudinal edge of the scale of the typewriter.

MARY C. MOSHER.

Witnesses:
BLANCH SEDGWICK,
ZELL G. ROE.